United States Patent [19]
Hollingworth

[11] Patent Number: 5,312,086
[45] Date of Patent: May 17, 1994

[54] TAPERED PLUG VALVE

[75] Inventor: Keith J. Hollingworth, Telford, England

[73] Assignee: BTR Plc, London, England

[21] Appl. No.: 34,764

[22] Filed: Mar. 19, 1993

[30] Foreign Application Priority Data

Apr. 7, 1992 [GB] United Kingdom ............ 9207576.1

[51] Int. Cl.⁵ .............................................. F16K 5/02
[52] U.S. Cl. ...................................... 251/309; 251/184
[58] Field of Search ................ 251/181, 183, 184, 309

[56] References Cited

U.S. PATENT DOCUMENTS

| | | | |
|---|---|---|---|
| 325,825 | 9/1885 | Drew | 251/183 |
| 2,024,905 | 12/1935 | Bard. | |
| 2,058,747 | 10/1936 | Wilkins. | |
| 2,110,098 | 3/1938 | Strecher | 251/184 |
| 3,434,691 | 3/1969 | Hamilton. | |
| 4,510,966 | 4/1985 | Parsons, Jr.. | |
| 4,519,414 | 5/1985 | Anaya | 251/309 X |

FOREIGN PATENT DOCUMENTS

| | | |
|---|---|---|
| 0100987 | 2/1984 | European Pat. Off.. |
| 421400 | 12/1934 | United Kingdom. |
| 834434 | 5/1960 | United Kingdom. |
| 850297 | 10/1960 | United Kingdom. |
| 1369885 | 10/1974 | United Kingdom. |

Primary Examiner—John C. Fox
Attorney, Agent, or Firm—Stevens, Davis, Miller & Mosher

[57] ABSTRACT

A tapered plug valve comprising a tapered plug rotatably mounted within a bore in a valve body to intercept a passageway. Spacing means is provided to limit the amount of axial movement of the plug and biasing e.g. spring means is provided to apply an axial force to the plug.

6 Claims, 1 Drawing Sheet

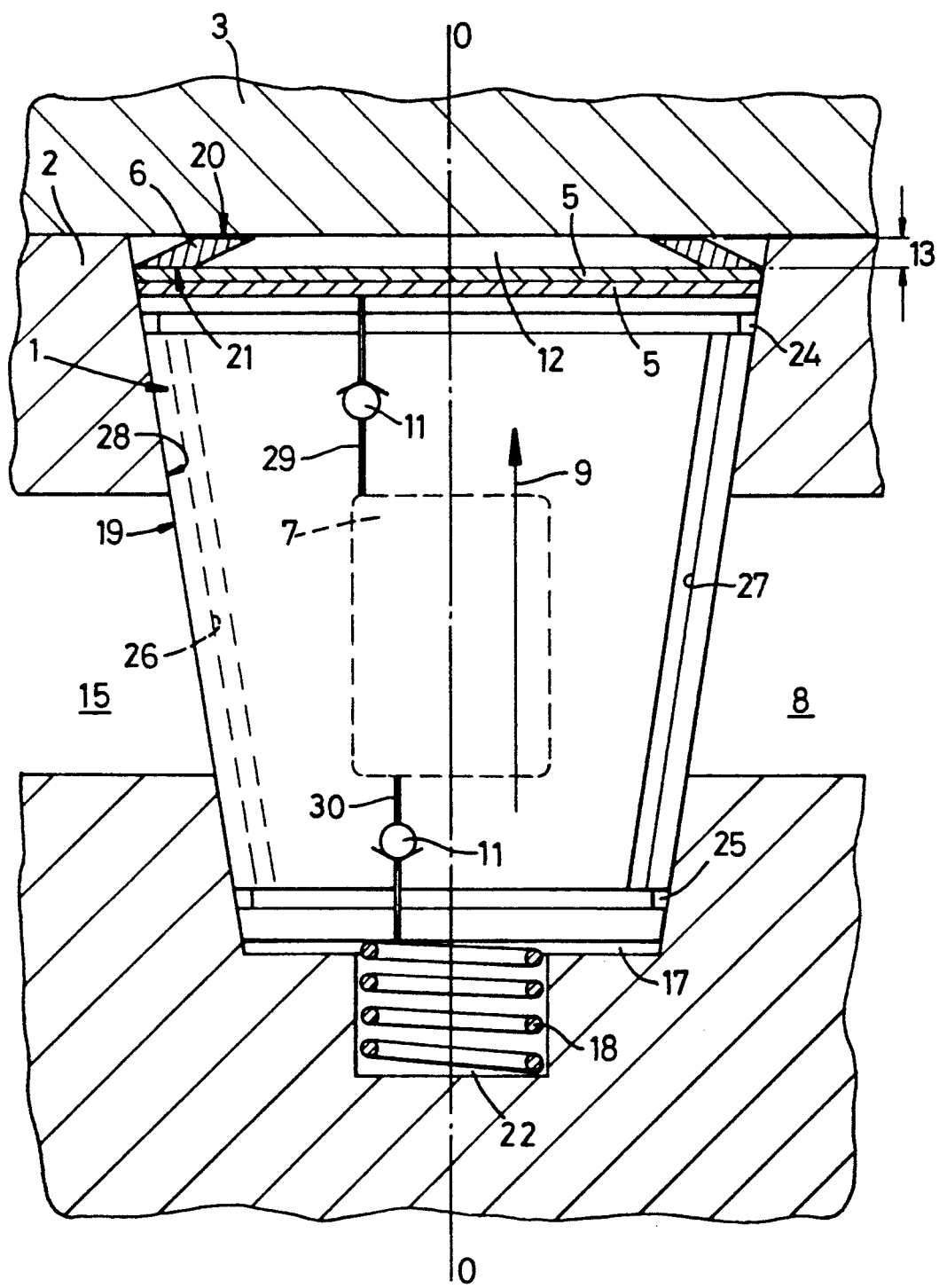

TAPERED PLUG VALVE

This invention relates to a tapered plug valve.

In accordance with the invention a tapered plug valve comprises a body having a passageway therethrough for flow of fluid, a tapered bore intercepting said passageway, a tapered plug rotatably mounted in the bore, adapted to block said passageway in a closed position of the valve, said plug having a port adapted to be in communication with said passageway in an open position of the valve, spacing means to limit the amount of movement of the plug along the rotational axis thereof away from the tapered bore, and biassing means capable of applying a force to urge the plug towards the tapered bore, which force is only created after the plug has moved a predetermined distance from the tapered bore.

Preferably the biassing means comprises spring means, such as a Belville washer, having opposing flat surfaces and of a required thickness. Preferably the spring means is sufficiently rigid so as not to be deformed (and thereby allow movement of the plug) during normal use, i.e. when subject to the line pressure of fluid flowing to or through the valve. The spring means is also preferably only capable of being deformed when subjected to a much greater force e.g. when sealant is applied under pressure between the plug and bore.

Preferably also the spacing means comprises at least one spacer shim of predetermined thickness.

One embodiment of the invention will now be described by way of example with reference to the accompanying single drawing of a cross-section through a tapered plug valve in the closed position.

As shown in the drawing the valve comprises a valve body 2 a passageway therethrough comprising an inlet port 8 and an outlet port 15, and a tapered plug 1 capable of being rotated about a vertical axis 0—0 through a predetermined angle greater than 90° e.g. 105° from a fully open position to a fully closed position, and retained in position by means of a cover plate 3 secured to the valve body by bolts (not shown).

The valve body 2 is formed with an interior circular cross-section tapered bore for receiving the correspondingly tapered plug 1. A port 7 is provided in the plug to connect the inlet port 8 to the outlet port 15 when the valve is open.

The plug 1 may be rotated between the open position and the closed position by means of a stem (not shown) which may be integrally attached to the plug and a handle or actuator (not shown).

The tapered bore is deliberately made to be deeper than the depth of the plug so that when the plug is placed in the bore spaces 12 and 17 are left at the top (wide end) and bottom (narrow end) respectively. The space 12 at the top of the plug is occupied by one or more shim spacers 5 and a spring 6. To decide on the number of spacers 5 and the thickness (depth) 13 of the spring, when the plug is in position the depth of the top space is measured accurately and the number and thickness of shim spacers and thickness of the spring chosen to ensure that there vertical movement of the plug 1. Typically the maximum amount of movement is 0.003"±0.0001" (i.e. 0.0762 ±0.0254 mm). This corresponds to a maximum radial clearance between the face 28 of the bore and the side 19 of the plug 1 of 0.00045"±0.00015" (i.e. 0.01143 ±0.00381 mm).

In this embodiment the spring 6 in the top space 12 is a Belville washer machined or ground to have opposing flat surfaces 20 and 21 and the required thickness 13, but other forms of high performance spring may be used. In addition a further spring 18 may be provided as shown at the bottom (narrow end) of the plug 1. This further spring 18 is located in an aperture 22 on the rotational axis 0—0 of the plug at the bottom of the bore.

The plug is provided with two circumferential grooves 24, 25, one 24 located near the top of the plug 1 and the other 25, near the bottom of the plug, connected by two diametrically opposed longitudinal grooves 26, 27. The longitudinal grooves are positioned so that they each sweep across the surface of the bore during rotation of the plug between the open and closed positions but never contact either of the inlet or outlet ports 8 and 15 respectively. All the grooves 24, 25, 26, 27 carry sealant to the facing surfaces 19, 28 of the plug and bore, the sealant also acting as a lubricant. A suitable port (not shown) is provided in the valve body 2 or cover 3 whereby sealant may be injected into the grooves.

The plug is optionally provided with two pressure relief valves 11, one in each of two passages 29, 30 connecting the top and bottom of the plug to the plug port 7 respectively.

In use the plug is normally under no axial load. If the further spring 18 is present it applies a very small load sufficient to ensure that the plug is not in 'sticking' contact with its seat on the interior surface of the bore or, if the spring 18 is sufficiently strong, it reacts against the spring 6 at the top of the plug to maintain the plug under a small load away from its seat but still limited to the predetermined amount of movement. When line pressure (i.e. the pressure of the fluid flowing through the valve) is applied to the port 7 the plug will tend to move towards the wider end i.e. upwards, in the direction of arrow 9. The spring at the top of the plug will not release to any significant extent so the plug 1 will still move within the predetermined limit.

When sealant is injected into the grooves 24, 25, 26, 27 in the plug to lubricate the valve, the injection pressure being much greater than line pressure, the plug will lift against the force applied by the spring 6 at the top of the valve allowing the sealant to flow from the grooves between the opposing surfaces of the plug and bore.

The pressure relief valves 11 serve to relieve the pressure from the spaces at the top and bottom of the plug in the event that line fluid is trapped in the port 7 when the plug is in the closed position. The relief valves may need to be balanced, because of the difference in areas at the top and bottom of the plug 1 to ensure that the pressure is always applied so as to tend to move the plug towards the larger area i.e. the top.

What I claim is:

1. A tapered plug valve comprising a body having a passageway therethrough for flow of fluid, a tapered bore intercepting said passageway, a tapered plug rotatably mounted in the bore, adapted to block said passageway in a closed position of the valve, said plug having a port adapted to be in communication with said passageway in an open position of the valve, spacing means to limit the amount of movement of the plug along the rotational axis thereof away from said tapered bore, and biassing means capable of applying a force to urge the plug towards the tapered bore, which force is only created after the plug has moved a predetermined distance from the tapered bore.

2. A tapered plug valve according to claim 1 wherein the biassing means comprises spring means.

3. A tapered plug valve according to claim 2 wherein the spring means comprises a Belville washer.

4. A tapered plug valve according to claim 2 wherein the spring means is formed to have opposing flat surfaces and a required thickness.

5. A tapered plug valve according to claim 2 wherein the spring means is sufficiently rigid so as not to be deformed in normal use of the valve.

6. A tapered plug valve according to claim 1 wherein the spacer means comprises at least one spacer shim of predetermined thickness.

* * * * *